United States Patent [19]
Shibata et al.

[11] 3,816,862
[45] June 18, 1974

[54] SEAT

[75] Inventors: Masaharu Shibata, Nagano; Kunio Sato, Toyota, both of Japan

[73] Assignee: NHK Spring Co., Ltd., Yokohama-shi, Japan

[22] Filed: Dec. 26, 1972

[21] Appl. No.: 318,660

[30] Foreign Application Priority Data
   Dec. 29, 1971  Japan................................ 47-2038
   Jan. 31, 1972  Japan.............................. 47-12921

[52] U.S. Cl............................. 5/351, 5/260, 5/267, 297/452, 267/83
[51] Int. Cl........................ A47c 23/04, A47c 25/00
[58] Field of Search............ 267/83, 102, 103, 107; 5/259 R, 260 R, 267, 351; 297/452, 456, DIG. 1, DIG. 2; 264/45

[56]         References Cited
          UNITED STATES PATENTS
2,469,216  5/1949  Spunt et al............................ 5/351
2,836,226  5/1958  Fridolph............................... 5/351
2,934,133  4/1960  Pawlikowski........................ 5/260
3,069,701  12/1962 McInerney............................ 5/351
3,363,943  1/1968  Getz et al............................. 297/452
3,459,611  8/1969  Joseph et al...................... 264/45 X

*Primary Examiner*—Casmir A. Nunberg
*Attorney, Agent, or Firm*—Kemon, Palmer & Estabrook

[57]              ABSTRACT

A seat is prepared by molding a synthetic resin foaming material integrally with a frame structure embedded therein. The frame structure includes an upper line frame extending along the upper outer periphery of the seat, a lower line frame connected to the upper line frame and supporting springs for resiliently supporting the upper line frame from below against the load of an occupant.

8 Claims, 8 Drawing Figures

PATENTED JUN 18 1974

3,816,862

SEAT

The present invention relates to a seat, and more particularly a seat having a cushion of synthetic resin foam in which an upper line frame and lower line frame are embedded.

In a seat of vehicles, for example, automobiles, an upper line frame and lower line frame are usually embedded in a cushion in a manner that the upper line frame is disposed to extend along the upper outer peripheral surface of the cushion for preventing a collapse of the cushion and is connected to the lower line frame. In the conventional seat, however, it is uncomfortable to sit on due to a poor cushiony effect. In order to avoid such drawback, an attempt is made to use metal springs in combination with metal frames to provide a supporting frame with its cushion supported from below in an effort to improve a cushiony effect. However, it is cumbersome or time-consuming to provide the frame structure separately from the cushion and, in addition, a satisfactory cushiony effect is not also obtained.

The object of the present invention is to provide a seat easy in manufacture, excellent in cushiony effect and very comfortable to sit on.

According to an aspect of the present invention a seat comprises a cushion made of molded synthetic resin foam and a support frame structure embedded in the cushion, the frame structure having an upper line frame disposed to extend along the upper outer periphery of the cushion for preventing a collapse of the cushion, a lower line frame disposed below the upper line frame and connected to the upper line frame, and support spring assemblies connected to the upper line frame at predetermined intervals and resiliently supporting the upper line frame from below.

The present invention can be more fully understood from the following detailed description when taken in connection with reference to the accompanying drawing, in which.

Figure 1:
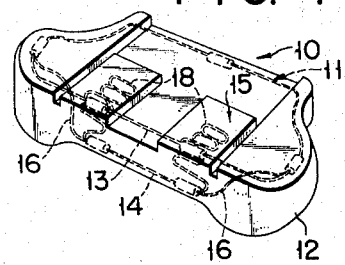
FIG. 1 is a perspective view showing one embodiment of the present invention.
Figure 2:
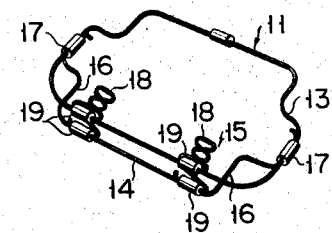
FIG. 2 is a perspective view showing a frame structure of the seat shown in FIG. 1.

Let us now explain one embodiment according to the present invention, by reference to FIGS. 1 and 2, as most suitably used as a rear seat of automobiles. A seat 10 comprises a cushion 12 prepared by molding from synthetic resin foaming material, for example, polyurethane foam integrally with a support frame structure 11 embedded in the cushion. The seat may be obtained by disposing the frame structure within a mold and filling the polyurethane resin into the mold for foaming. In this case, if an outer layer of the seat is previously placed within the mold, the foam of synthetic resin makes a complete seat of which cushion is integrally covered with the outer layer. The frame structure has an upper line frame 13 extending along the upper outer periphery of the seat of the cushion to prevent a collapse of the cushion; a lower line frame 14 connected to the upper line frame and support spring assembly 15 for resiliently supporting the upper line frame from below. In a preferred embodiment, the upper line frame 13 is made of a substantially rectangular loop-like hard steel wire of about 5 mm in diameter and the lower line frame 14 is made of the same spring metal wire as the upper line frame, whose central portion extends substantially in a straight line along the outside front portion of the cushion and whose side portions are bent backwards in a horizontal plane with both the ends bent upwards. The upwardly bent ends of the lower line frame are connected to the associated sides of the upper line frame to provide torsion bars 16 respectively. Such connection of the ends of the lower line frame to the sides of the upper line frame is made by a connecting clip 17 to provide added strength.

The support spring assemblies 15 consist of the abovementioned torsion bars 16 and a plurality of compression srings such as zigzag springs 18. The ends of the zigzag spring are connected respectively to the upper line frame 13 and lower line frame 14 by connecting clips 19 and the zigzag spring is bent backwards at its central part in substantially a "caret" shape. In this embodiment, two zigzag springs 18 are arranged in horizontally symmetrical relationship with the center of the cushion. It will be understood that the number and position of the zigzag spring can be optionally selected.

With the seat 10 so constructed, if the occupant is relatively light in weight, then he can have a soft, cushiony feeling afforded by the synthetic resin foam only. If the occupant is heavy in weight, then he can have a resilient, cushiony feeling provided by a combination of the resilient cushion 12 and the support springs 15 consisting of the torsion bars 16 and zigzag springs 18. As a result, the occupant can have a comfortable, cushiony feeling at all times irrespective of his weight.

Let us explain the modifications of the frame structure by reference to FIGS. 3 to 8. In these Figures, same reference numerals are used to denote like parts or elements and further explanation is therefore omitted.

Figure 3:
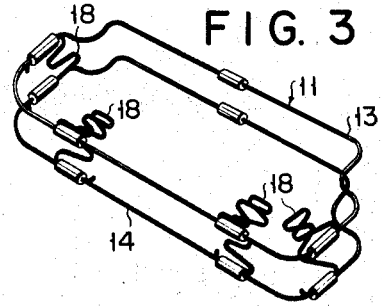
FIGS. 3 to 8 are perspective views each showing a modification of the frame structure shown in FIG. 2.

Referring to FIG. 3 an upper line frame 13 is formed in substantially the same shape as a lower line frame 14. These frames are disposed in a predetermined spaced-apart relationship to each other and resiliently connected to each other by four zigzag springs 18 bent inwards in substantially a "caret" shape. That is, one pair of zigzag springs 18 are disposed at the front portions of the frame structure in substantially the same manner as in FIG. 2 and the other pair of zigzag springs 18 are disposed at the sides of the frame structure and opposite to each other.

Figure 4:
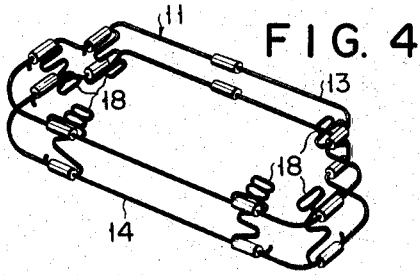

In FIG. 4 a frame structure is substantially the same as in FIG. 3 except that an additional pair of zigzag springs 18 are disposed at the back to the sides of the upper and lower frames and opposite to each other.

Figure 5:
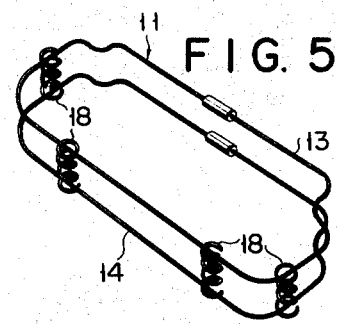

Referring to FIG. 5 a frame structure is substantially the same as in FIG. 3 except that the zigzag springs are all replaced by coil springs 18. In this frame structure an upper line frame 13 is connected to a lower line frame 14 by the coil springs which act as a vertical supporter.

Figure 6:
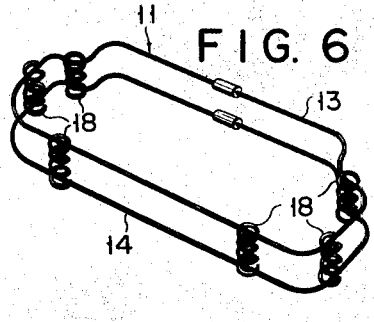

In FIG. 6 a frame structure is substantially the same as in FIG. 4 except that the zigzag springs are all replaced by six supporting coil springs 18.

Figure 7:
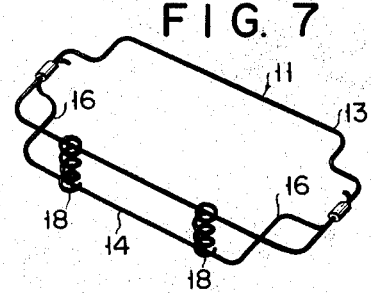

In a frame structure 11 as shown in FIG. 7 an upper line frame 13 is connected to a lower line frame 14 by a pair of torsion bars 16 in a manner as shown in FIG. 2. In this frame structure a pair of coil springs 18 are vertically arranged, at the front portions of the frame structure, between an upper line frame 13 and lower line frame 14 and symmetrical with respect to each other.

Figure 8:
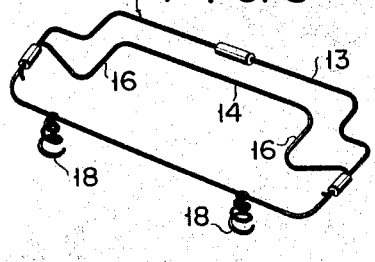

In the modification as shown in FIG. 8 a lower line frame 14 has a straight central portion run along the straight rear portion of an upper line frame 13 and with its ends first bent forwardly in a horizontal plane and then bent upwardly so as to be connected to the upper line frame. At the central portion of the upper line frame there are symmetrically arranged a pair of conical springs whose one end is free, and the other end of the conical spring is connected to the central portion of the upper line frame.

What we claim is:

1. A seat comprising a supporting frame structure integrally embedded in a cushion made of molded synthetic resin foam that forms a matrix for said frame structure, said cushion being supported by said embedded supporting frame structure for resistance against collapse by a weighted body placed upon the top surface thereof only around the periphery of said cushion, said frame structure comprising an upper line frame that extends around the periphery of the cushion adjacent the top surface thereof leaving the central portion of the cushion devoid of frame structure, a lower line frame disposed below said upper line frame and connected to said upper line frame and support spring assemblies connected to said upper line frame at predetermined intervals and resiliently supporting the upper line frame from below.

2. A seat according to claim 1 wherein said lower line frame has a central portion extending along the outside front portion of the cushion, opposite side portions bent backwards in a horizontal plane with both ends bent upwards to be connected with the side portions of the upper line frame, the side portions of the lower line frame constituting torsion bars, and said support spring assemblies respectively include compression springs connected between the front portions of the upper and lower line frames.

3. A seat according to claim 2 wherein said compression springs consist of zigzag springs rearwardly bent at the central portion.

4. A seat according to claim 2 wherein said compression springs consist of coil springs.

5. A seat according to claim 1 wherein the lower line frame has a looped shape and said support spring assemblies are compression springs connected between the upper and lower line frames.

6. A seat according to claim 5 wherein the compression springs are one pair of springs disposed on the front side of the cushion at a predetermined interval and the other pair of springs disposed on the opposite sides of the cushion.

7. A seat according to claim 5 wherein the compression springs are one pair of springs disposed on the front side of the cushion at a predetermined interval and two pair of springs disposed on the opposite sides of the cushion, the two springs disposed on each side are positioned at a predetermined interval.

8. A seat according to claim 1 wherein said lower line frame has a central portion extending along the outside rear portion of the cushion, opposite side portions bent forward in a horizontal plane with both ends bent upwards to be connected with the side portions of the upper line frame, the side portions of the lower line frame constituting torsion bars, and said support spring assemblies respectively include compression springs with the top connected to the front side of the upper line frame.

* * * * *